(12) United States Patent
Furumochi et al.

(10) Patent No.: US 7,044,649 B2
(45) Date of Patent: May 16, 2006

(54) OPTICAL FILTER MODULE, AND MANUFACTURING METHOD THEREOF (75) Inventors: Takaaki Furumochi, Neyagawa (JP); Kazunari Nishihara, Sakai (JP); Tetsuro Shimamura, Kyoto (JP); Mikio Degawa, Katano (JP)

(73) Assignee: Matsushita Electric Industrial Co., Ltd., (JP)

( * ) Notice: Subject to any disclaimer, the term of this patent is extended or adjusted under 35 U.S.C. 154(b) by 173 days.

(21) Appl. No.: 10/470,295

(22) PCT Filed: Oct. 4, 2002

(86) PCT No.: PCT/JP02/10360

§ 371 (c)(1),
(2), (4) Date: Jul. 29, 2003

(87) PCT Pub. No.: WO03/032032

PCT Pub. Date: Apr. 17, 2003

(65) Prior Publication Data
US 2004/0114876 A1 Jun. 17, 2004

(30) Foreign Application Priority Data
Oct. 4, 2001 (JP) ............................. 2001-308309

(51) Int. Cl.
G02B 6/38 (2006.01)
(52) U.S. Cl. .................. 385/73; 385/70; 385/55
(58) Field of Classification Search ............... 385/73, 385/55, 88, 58, 59, 65, 56, 31, 83, 77
See application file for complete search history.

(56) References Cited

U.S. PATENT DOCUMENTS

| 4,958,897 | A | | 9/1990 | Yanagawa et al. ....... 350/96.15 |
| 6,085,000 | A | * | 7/2000 | Tanaka et al. ................ 385/45 |
| 6,215,655 | B1 | * | 4/2001 | Heady et al. ............... 361/683 |
| 6,535,655 | B1 | * | 3/2003 | Hasui et al. ................... 385/11 |
| 2004/0027705 | A1 | * | 2/2004 | Nishihara et al. .......... 359/891 |
| 2004/0042728 | A1 | * | 3/2004 | Ito et al. ....................... 385/49 |

FOREIGN PATENT DOCUMENTS

| EP | 0 908 746 A2 | 4/1999 |
| JP | 64-34604 | 3/1989 |
| JP | 2-34806 | 2/1990 |
| JP | 2-267501 | 11/1990 |
| JP | 2-284103 | 11/1990 |
| JP | 6-34837 | 2/1994 |
| JP | 6-59143 | 3/1994 |
| JP | 7-5346 | 1/1995 |
| JP | 7-281049 | 10/1995 |

(Continued)

Primary Examiner—Frank G. Font
Assistant Examiner—James P. Hughes
(74) Attorney, Agent, or Firm—Steptoe & Johnson LLP (57) ABSTRACT An optical filter module having a multilayered filter inserted in the paths of optical waveguides thereof. In the optical filter module, precise V-shaped grooves are formed on the principle plane of a plane substrate so that optical fibers protrude therefrom. The optical fibers are mounted on the plane substrate. After the multilayered filter is inserted in a filter insertion groove that is formed so as to intersect the V-shaped grooves on the plane substrate, the filter is sandwiched and clamped by two sheets of covers provided on the plane substrate. Provided is a method of precisely mounting the filter that improves the optical axis adjustment between input and output optical fibers and reduces misregistration of the filter to be inserted.

21 Claims, 9 Drawing Sheets

FOREIGN PATENT DOCUMENTS

| | | |
|---|---|---|
| JP | 8-184712 | 7/1996 |
| JP | 08179128 | 7/1996 |
| JP | 8-211228 | 8/1996 |
| JP | 8-297214 | 11/1996 |
| JP | 09021912 | 1/1997 |
| JP | 09061664 | 3/1997 |
| JP | 9-105824 | 4/1997 |
| JP | 10-48439 | 2/1998 |
| JP | 10-307221 | 11/1998 |
| JP | 10300936 | 11/1998 |
| JP | 11167043 | 6/1999 |
| JP | 2000193852 | 7/2000 |

* cited by examiner

OPTICAL FILTER MODULE, AND MANUFACTURING METHOD THEREOF

TECHNICAL FIELD

The present invention relates to an optical filter module for optical communication that incorporates various kinds of optical filters therein and to a method of manufacturing the optical filter module.

BACKGROUND ART

Figure 8A:
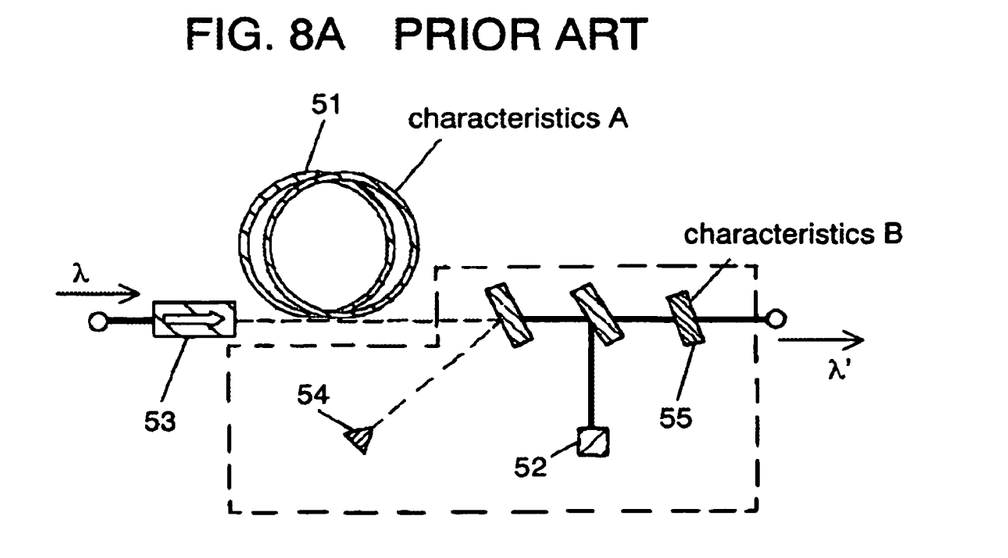
FIG. 8A is a drawing illustrating a structure of a conventional example of an optical amplifying system.

In an optical information communication system using optical fibers, light is attenuated by being radiated from or absorbed by the optical fibers. Used as a system for amplifying this attenuated light is an optical fiber amplifier. Being capable of amplifying the output without converting optical signals into electrical signals, the optical fiber amplifier is a system essential to an optical communication network. FIG. 8A shows an example of the structure of the system. An optical fiber amplifier is made of optical isolator 53, erbium-doped optical fiber 51, pumping laser 54 used as laser light for excitation, photodiode 52 for monitoring output, and filter 55 for adjusting gains. As pumping laser 54 for a single-mode fiber, laser light having a wavelength of 1.48 μm is used.

Figure 8B:
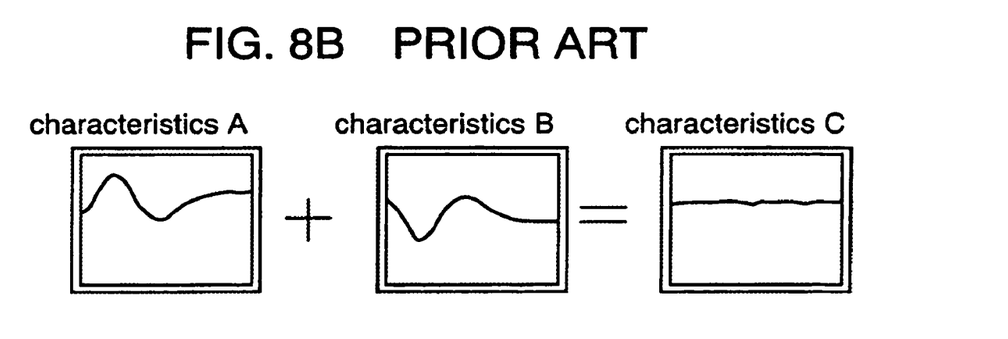
FIG. 8B is a drawing showing characteristics of the conventional example of the optical amplifying system.
Figure 8C:
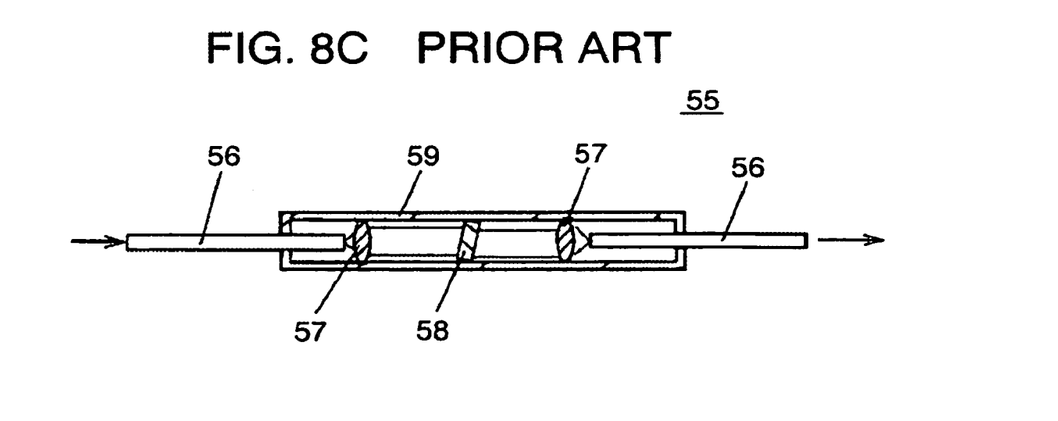
FIG. 8C is a sectional view of a conventional optical filter module.

The amplification gains of erbium-doped optical fiber 51 are dependent on frequencies, as shown by characteristics A of FIG. 8B. Therefore, it is necessary to insert filter 55 having characteristics B, i.e. the inverse of characteristics A, into the transmission path after the amplification of optical output and flatten the amplification gains as shown by characteristics C. Filter 55 is called a gain-flattening filter. Generally, filter 55 is used as a part of a module that incorporates the filter inserted between optical fibers. FIG. 8C shows the structure of the module. In the module, optical fibers 56, collimating and collective lenses 57, and gain-flattening filter 58 are housed and sealed into metal housing 59 after optical axis adjustment.

In the optical passage connection method and the filter insertion method in the conventional module using lenses described above, the lenses themselves have certain sizes, and distances between the optical passages and the lenses necessary for focusing are required. Therefore, the size reduction of the entire module is restricted to a certain degree.

Additionally, each of the optical passages must be connected accurately. For a module using lenses, adjustment of the lenses requires cost and time: thus, productivity of the module is poor.

Figure 9A:
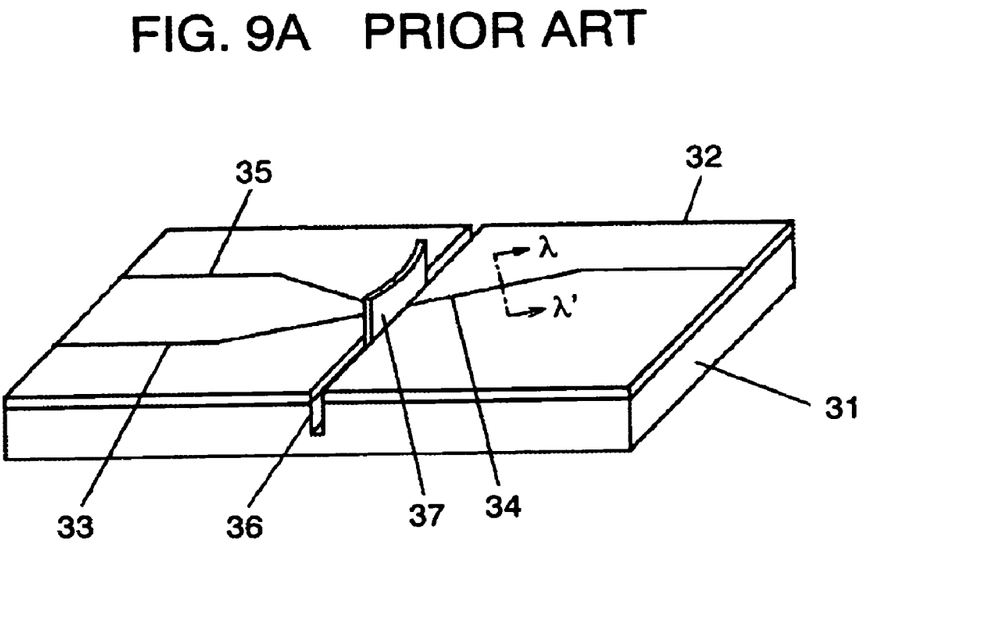
FIG. 9A is an explanatory view illustrating how to mount a conventional optical filter.
Figure 9B:
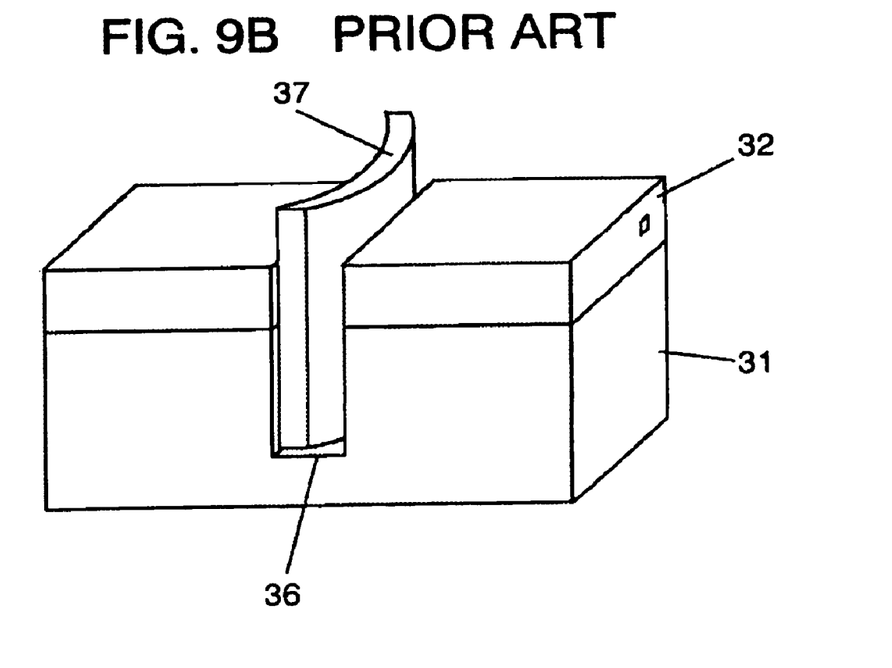
FIG. 9B is an enlarged view of an essential part of FIG. 9A.

Proposed as a method of addressing the problems described above is the Japanese Patent No. 3175814. FIGS. 9A and 9B are drawings showing the structure of the invention. The invention is an example of a reflection type optical multiplexer/demultiplexer for wavelength division multiplexing (WDM) in which a filter insertion groove is formed so as to intersect embedded optical waveguides formed on a silicon substrate, and a multilayered filter is inserted and integrated in the groove.

Passages for guiding the waves of light are formed in one surface of clad material 32 on silicon substrate 31 as waveguides. Filter insertion groove 36 is formed so as to intersect the waveguides. This structure eliminates the need of adjustment of optical axes of input waveguide 33 and output waveguides 35 and 34. Further, width Dg of filter insertion groove 36 and radius of curvature R of the warp of multilayered filer 37 (hereinafter referred to as a "filter") are set so as to satisfy the following relation:

$$R<W^2/8(Dg-Df)$$

where the lateral width of filter 37 is W, and the thickness thereof is Df. This relation proposes a structure in which filter 37 can securely be fitted in filter insertion groove 36 utilizing the warp of filter 37. In other words, proposed is a module structure in which embedded optical waveguides form optical waveguide paths, and various kinds of filters are inserted and integrated in the paths.

However, in this system, filter 37 has a warp having at least a certain radius of curvature. Therefore, when the filter isn't mounted at the exactly correct position, the angle of incidence to filter 37 is largely displaced. Further, when embedded waveguides are used as optical waveguide paths, the warp of multilayered filter 37 inevitably generates a gap between the multilayered filter and waveguides 35 and 33 in filter insertion groove 36. This gap causes scattering and loss of light from waveguides 35 and 33. Additionally, it is extremely difficult and thus disadvantageous for production to mechanically hold and insert a warped component in a microgroove.

DISCLOSURE OF THE INVENTION

Proposed is an optical filter module in which a filter insertion groove is formed so as to intersect optical passages on a plane substrate, a filter is inserted in this filter insertion groove, and covers cover the optical passages so as to be bonded onto the plane substrate.

DETAILED DESCRIPTION OF PREFERRED EMBODIMENTS

Exemplary embodiments of the present invention are described hereinafter with reference to the accompanying drawings. Same elements are denoted with the same reference numbers, and their detailed descriptions are omitted.

First Exemplary Embodiment

Figure 1A:
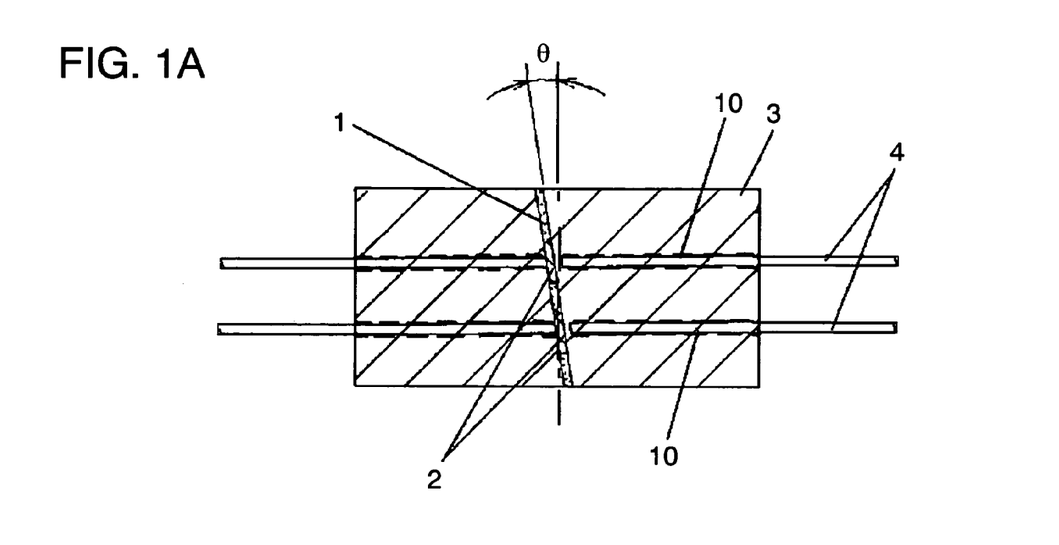
FIG. 1A is a top view illustrating a structure of an optical filter module in accordance with a first exemplary embodiment of the present invention.
Figure 1B:
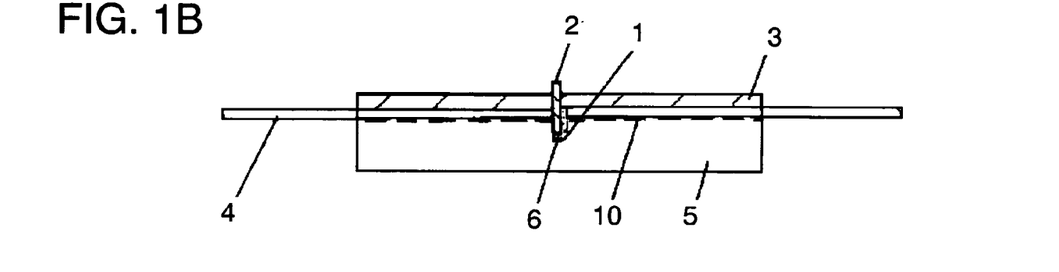
FIG. 1B is a side view of the optical filter module in accordance with the first exemplary embodiment of the present invention.
Figure 1C:
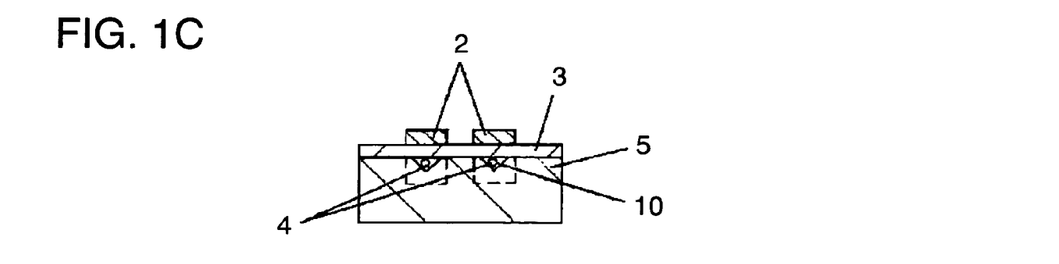
FIG. 1C is a sectional view of the optical filter module in accordance with the first exemplary embodiment of the present invention.

FIG. 1A shows a top view of an optical filter module having two optical passes in accordance with a first exemplary embodiment of the present invention. FIG. 1B shows a side view thereof. FIG. 1C shows a sectional view thereof. Filter 2 is inserted in a filter insertion groove 1 (hereinafter referred to as a "groove"), and bonded by optical adhesive 6. Each of optical fibers 4 for forming optical passages is provided in a space that is formed by V-shaped groove 10, formed on the principle surface of plane substrate 5, and covers 3.

In production of an optical filter module, optical passages are not necessarily integrated with plane substrate 5. This renders greater general versatility to materials of the optical passages and plane substrate. When an optical passage that is not integrated with plane substrate 5, such as optical fiber 4, is used, precise V-shaped groove 10 is formed on plane substrate 5 for fixation of optical fiber 4. The V-shaped groove is used as a guide for fixation of optical fiber 4. Production of filter insertion groove 1 so as to intersect V-shaped grooves 10 facilitates insertion and connection of filter 2, without causing misalignment of the optical axes of optical fibers 4. Further, the extremely simple structure allows downsizing of the module and improvement of productivity thereof.

Filter 2 is formed by laminating a large number of dielectric thin films made of a material, e.g. $SiO_2$ and $Ta_2O_5$, on a resin substrate made of a material, e.g. glass and polyimide.

Covers 3 and plane substrate 5 are formed of glass, silicon, or other materials. Desirably, the covers and plane substrate have linear expansion coefficients approximating to that of optical fibers 4. However, when a resin-based adhesive (not shown) is used for bonding them, the elasticity of the adhesive can alleviate the stress caused by the difference in liner expansion coefficient. When a photo-curing adhesive is used, it is desirable that the covers and plane substrate are made of optically transparent materials.

In order to prevent light from scattering from the end faces of optical fibers 4, an optical adhesive having a refractive index substantially equal to that of a material used for optical fibers 4 is used as optical adhesive 6. When optical fibers 4 made of fused silica are used, it is preferable to use optical adhesive 6 having a refractive index approximating to 1.44, i.e. the refractive index of fused silica.

Formed on plane substrate 5 are V-shaped grooves 10 for mounting and fixing optical fibers 4. Machining V-shaped grooves 10 so as to have a depth and angle of predetermined values allows the optical fibers 4 to be sandwiched by covers 3 and plane substrate 5 and mounted without misregistration. V-shaped grooves 10 can also be formed on covers 3 in addition to plane substrate 5. Setting the following equation:

$$d = r/\sin(\alpha/2)$$

allows the center of optical fiber 4 to be placed on the surfaces of cover 3 and plane substrate 5, where the point angle of each of V-shaped grooves 10 on plane substrate 5 and cover 3 is α the radius of optical fiber 4 to be mounted is r, and the depth of each V-shaped groove 10 is d. Generally, the diameter of a clad, i.e. the optical passage of a glass-based optical fiber is 125 μm. Thus, setting the point angle of V-shaped groove 10 to 90 degrees and the depth thereof to approx. 180 μm, and sandwiching fiber 4 between cover 3 and plane substrate 5 can securely clamp optical fiber 4. V-shaped grooves 10 formed on covers 3 and plane substrate 5 need not have the same depth and angle necessarily. The angle and depth of V-shaped groove 10 formed on cover 3 are set to values equal to or larger than those of a portion of optical fiber 4 projecting from the principle surface of plane substrate 5, when optical fiber 4 is mounted in V-shaped groove 10 on plane substrate 5. Thus, cover 3 and plane substrate 5 allow the optical fiber to be mounted and clamped securely.

Groove 1 in plane substrate 5 is formed to have a predetermined angle of θ with respect to optical fibers 4. This is for preventing light incident from optical fibers 4 upon filter 2 from reflecting. The tilt angle depends on the wavelength of light to be guided. For example, when light having a wavelength of 1.48 μm is guided using a single-mode fiber, it is desirable to provide a tilt angle θ ranging from approx. 5 to 10 degrees. For a tilt angle θ smaller than 5 degrees, reflection has greater influence. For a tilt angle θ exceeding 10 degrees, refraction makes it difficult to set the optical axes, and affects the characteristics of filter 2.

In this embodiment, a groove is formed across continuous lengths of optical passages and a filter is inserted therein. This structure simplifies adjustment of the optical axes of the optical passages. Further, eliminating the need of using lenses simplifies the structure. As a result, the entire optical filter module is downsized.

The use of a core diameter expanding fiber having a partially expanded core in which light in optical fiber 4 is enclosed and guided further reduces the loss caused by connection of optical fiber 4 and filter 2.

The optical filter module of this embodiment is structured so that groove 1 is formed so as to intersect optical passages 4 and filter 2 is inserted therein. Because of this structure, optical fibers 4 are cut by groove 1, and gap G having a width of groove 1 exists between the endfaces of optical fibers 4 via filter 2. When spot size W of light at each of the endfaces of optical fibers 4 is the same, power transmission coefficient Tg between the endfaces of optical fibers 4 via gap length G is represented by the following equation:

$$Tg = [1 + (\lambda \times G/(2 \times \pi \times n \times W^2))^2]^{-1}$$

where the refractive index of multilayered filter 2 is n, and λ represents a wavelength. This equation indicates that the transmission loss increases in proportion to increases in wavelength and gap length G and rapidly decreases in proportion to the inverse number of the square of a spot size.

As a result, the larger spot size at each of the endfaces of optical fibers 4 exposed to the wall surface of groove 1 is advantageous for reducing the transmission loss. As a core diameter expanding fiber, various kinds of types are proposed. Typical examples include a thermally expanded core (TEC) fiber. This optical fiber is a special one in which a doped element for controlling the refractive index of the core, such as $GeO_2$, is diffused to a part of the clad by heating a part of the clad, to substantially expand the core diameter. The use of this kind of optical fiber increases the spot size of light emitted from each endface of optical fibers 4. When a core diameter expanding fiber is used for the optical filter module of the present invention, groove 1 is machined and formed so as to intersect the largest portion of the core diameter expanding part in each optical passage 4.

As a result, the larger spot size at each of the endfaces of optical fibers 4 exposed to the wall surface of groove 1 is advantageous for reducing the transmission loss. As a core diameter expanding fiber, various kinds of types are proposed. Typical examples include a thermally expanded core (TEC) fiber. This optical fiber is a special one in which a doped element for controlling the refractive index of the core, such as $GeO_2$, is diffused to a part of the clad by heating a part of the clad, to substantially expand the core diameter. The use of this kind of optical fiber increases the spot size of light emitted from each endface of optical fibers 4. When a core diameter expanding fiber is used for the optical filter module of the present invention, groove 1 is machined and formed so as to intersect the largest portion of the core diameter expanding part in each optical passage 4.

Figure 2A:
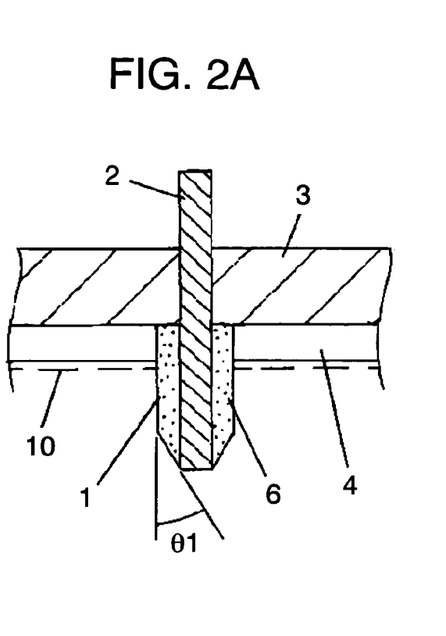
FIGS. 2A through 2D are sectional views each illustrating a shape of a filter insertion groove in the structure of the optical filter module in accordance with the first exemplary embodiment of the present invention.
Figure 2B:
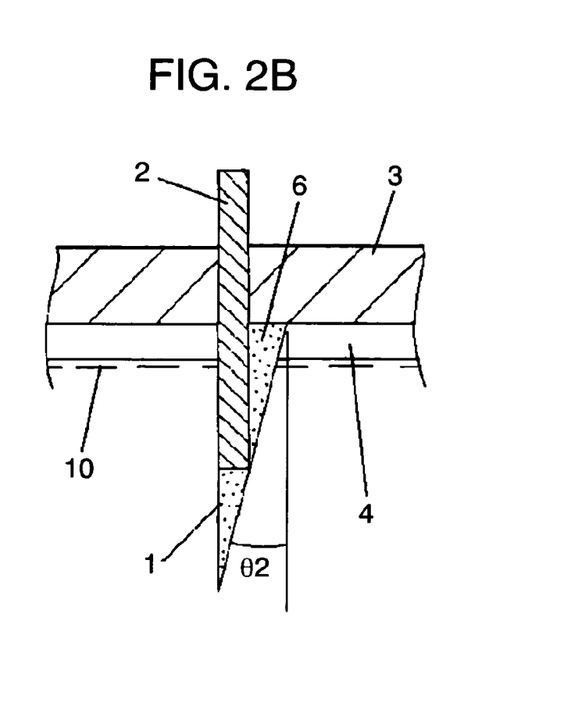
Figure 2C:
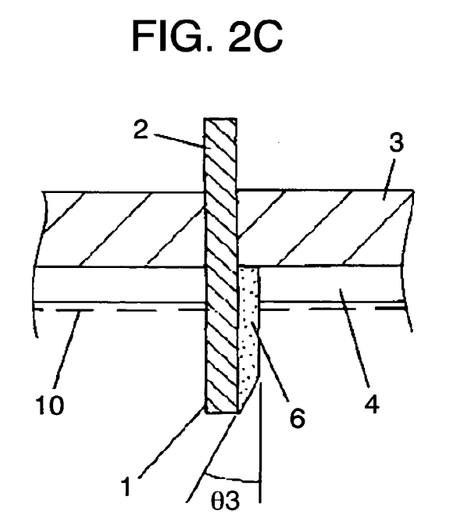
Figure 2D:
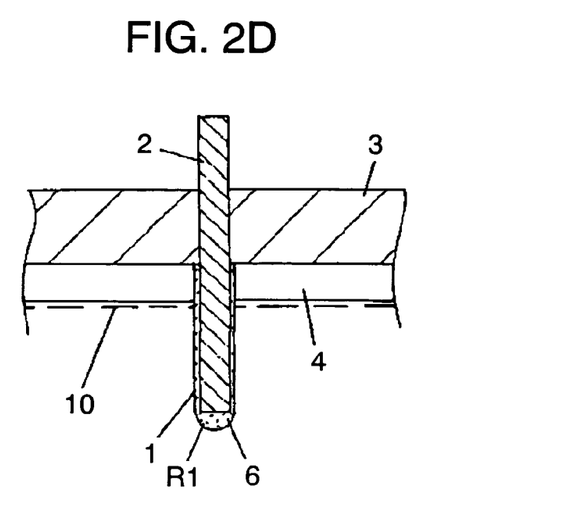

Various shapes shown in FIGS. 2A through 2D are applicable as the shape of groove 1. The bottom of groove 1 shown in FIG. 2A is shaped to be shallower on the sides of both groove walls, and have a flat portion at the center of the bottom of which central portion is deeper at an angle of θ1. FIG. 2B shows a case where groove 1 has a certain angle of θ2 from the bottom to the principle surface of plane substrate 5 on the side of one of groove walls. FIG. 2C shows a case where a part of the bottom of groove 1 has a flat portion on the side of one of groove walls, and the bottom has a certain angle of θ3 from the flat portion to the side of the other groove wall. In FIG. 2D, the bottom of groove 1 is shaped semi-circular.

Each of these grooves 1 is formed using a diamond grindstone having a tip previously formed into the shape of the groove, for example. Because groove 1 is formed by transferring the shape of the tip of the diamond grindstone to the groove shape, the groove shape after machining largely depends on the forming accuracy of the diamond grindstone. When the width of a grindstone is up to 0.1 mm, machining is difficult because the diameters of usable diamond particles are restricted. However, when the width of the grindstone exceeds 0.1 mm, machining the shapes is relatively easy.

As shown in FIGS. 2A through 2C, groove 1 is machined to irregular shapes so that the tilt angle formed by one groove wall with the other is small. The reason for machining in this manner is to prevent filter 2 from tilting after insertion. When groove 1 is formed using the endface of cover 3 previously mounted as a reference surface, force is exerted in the direction in which the diamond grindstone for machining is forced toward cover 3, i.e. the reference surface, during machining. In order to prevent deterioration of machining accuracy of groove 1 caused by meander of the diamond grindstone, such machining is effective.

Tapering the bottom of groove 1 from both groove walls to the bottom surface as shown in FIG. 2A prevents inserted filter 2 from vacillating and being fixed at a different angle with respect to the optical axes.

Groove 1 shown in FIG. 2B has the effects equivalent to those of groove 1 shown in FIG. 2A. Additionally, forming the section of groove 1 into a V shape as shown in FIG. 2B allows filter 2 that is even extremely thin for groove 1 to be fixed securely as long as it is inserted as far as it goes. In other words, the V-shaped groove broadens the allowable range of the thickness of filter 2 with respect to groove 1.

Groove 1 shown in FIG. 2D has the effects equivalent to those of groove 1 shown in FIG. 2A. Additionally, forming the bottom surface of groove 1 semicircular as shown in FIG. 2D facilitates machining in production of groove 1. Further, because the bottom surface is curved, the angle at which filter 2 is erected in groove 1 can freely be set in the range of the width of the groove.

Groove 1 shown in FIG. 2C has the effects equivalent to those of groove 1 shown in FIG. 2A. Additionally, groove 1 as shown in FIG. 2C has a bottom tapered from one of groove walls to the other. Because one groove wall is not tapered, filter 2 can be fixed along the surface. Further, even when optical fibers 4 and covers 3 are attached before machining of the groove, groove 1 of such a shape can be formed without a bit hitting covers 3 or displaced from the endfaces of the covers during machining.

In the first exemplary embodiment, the optical filter module has two optical fibers. However, an optical filter module having one optical passage can be fabricated. Inversely, it is also possible to provide a filter insertion groove in a place where a plurality of optical passages intersect or a plurality of optical passages are disposed in parallel with each other, so as to intersect the optical passages, and insert a filter in the groove. Therefore, the effects of the filter can be shared by a plurality of optical passages, and thus a more multi-functional optical filter module can be fabricated.

Second Exemplary Embodiment

Figure 3A:
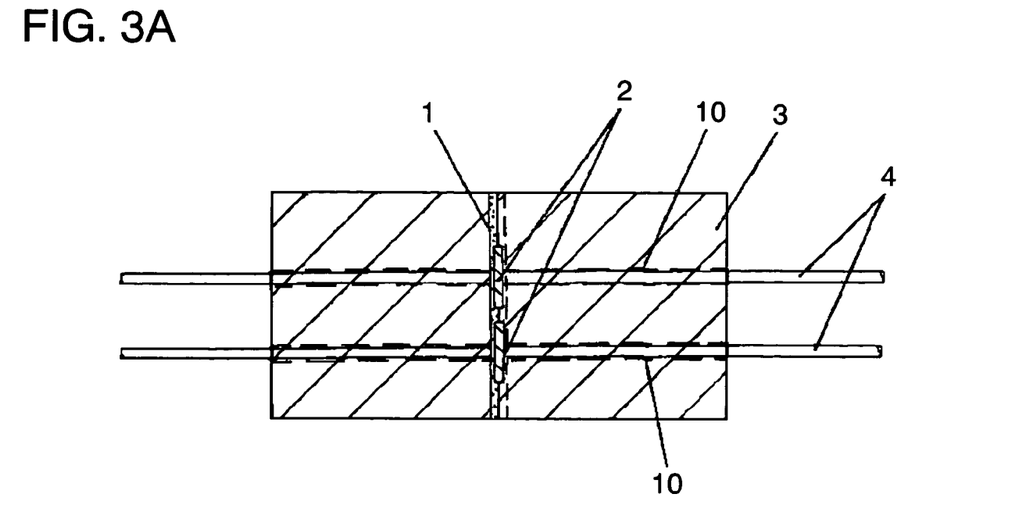
FIG. 3A is a top view illustrating an example of a structure of an optical filter module in accordance with a second exemplary embodiment of the present invention.
Figure 3B:
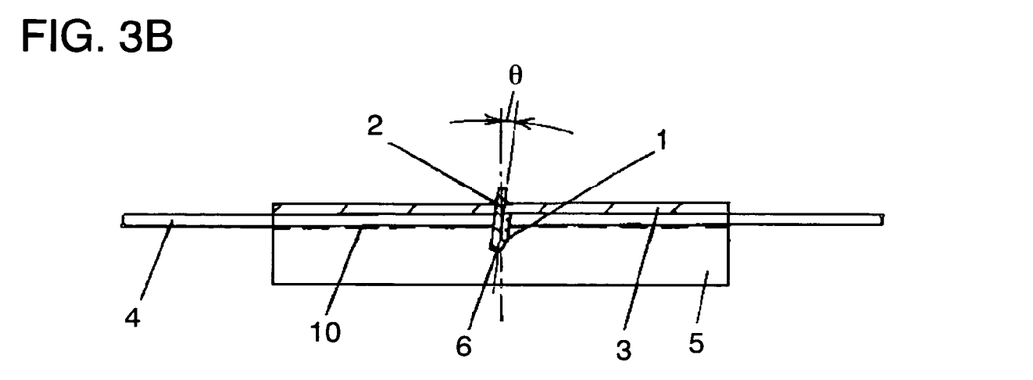
FIG. 3B is a side view of the optical filter module in accordance with the second exemplary embodiment of the present invention.
Figure 3C:
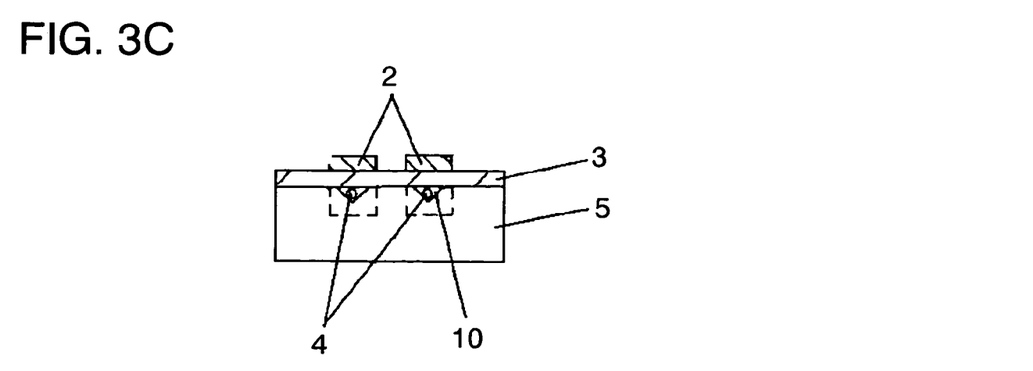
FIG. 3C is a sectional view of the optical filter module in accordance with the second exemplary embodiment of the present invention.

FIG. 3A shows a top view of an optical filter module in accordance with a second exemplary embodiment. FIG. 3B shows a side view thereof. FIG. 3C shows a sectional view thereof. What is different from the first exemplary embodiment is described hereinafter. In FIG. 1A, a minute angle θ is provided in order to prevent scattering and reflection caused by filter insertion groove 1. However, in FIG. 3A, this minute angle θ is not provided. Instead, a minute angle θ is provided in groove 1 in the side view of FIG. 3B. For this reason, in order to prevent deterioration of machining accuracy, it is desirable to have a groove structured as shown in FIG. 2B or 2C. In every respect other than described above, this embodiment has a structure and effects similar to those of the first exemplary embodiment. Similarly, a more multi-functional optical filter module having two or more optical passages can also be fabricated.

Third Exemplary Embodiment

Described hereinafter is a method of fabricating a structure of an optical filter module. FIGS. 4A through 4G are sectional views sequentially showing a procedure of fabricating an optical filter module of the present invention.

Figure 4A:
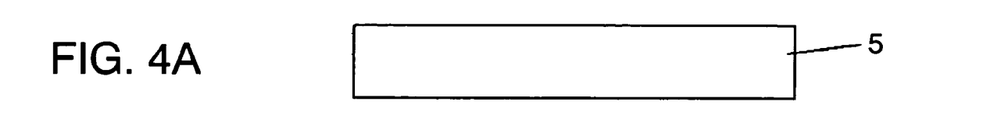
FIGS. 4A through 4G are explanatory views illustrating a method of manufacturing an optical filter module in accordance with a third exemplary embodiment of the present invention.
Figure 4B:
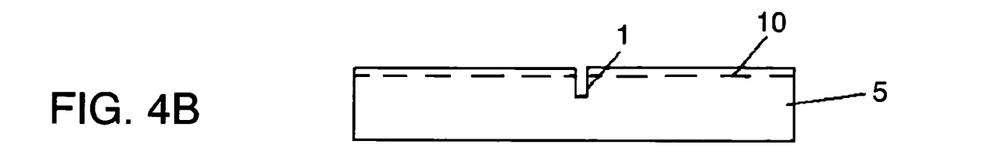

As a first step, as shown in FIG. 4B, a necessary number of V-shaped grooves 10 for fixing optical fibers 4 forming optical passages are precisely formed on plane substrate 5 shown in FIG. 4A. Next, as a second step, filter insertion groove 1 sufficiently wide for the thickness of filter 2 is formed so as to intersect these precise V-shaped grooves 10. At this time, as shown in the first and second exemplary embodiments, groove 1 is formed so as to be displaced at a minute angle of θ from the right angle of the optical passages. Specifically, θ ranges from 5 to 10 degrees, and is changed according to the wavelength of light to be used. Placing filter 2 along the wall surface of groove 1 formed at an arbitrary angle required allows filter 2 to be fixed at the arbitrary angle designed. Groove 1 is formed to have an appropriate shape selected from the structures shown in FIGS. 2A through 2D.

For example, groove 1 is formed by grinding with a grindstone shaped to the groove using cubic boron nitride or diamond as abrasive grains, or machining using particles, such as blasting. When silicon is used as a material of plane substrate 5, wet etching or dry etching can also be used. When groove 1 is machined to have an irregular sectional shape, the use of a formed grindstone allows production of the irregular shapes more freely and thus is more advantageous.

Figure 4C:
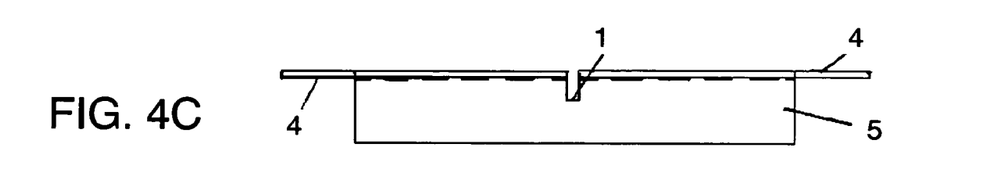

As a third step, as shown in FIG. 4C, each optical fiber 4 is installed in corresponding V-shaped groove 10. At this time, it is desirable that the portion of mounted optical fiber 4 is a clad portion with coating removed, in consideration with mounting accuracy. Additionally, the angle and depth of each V-shaped groove 10 are set so that each optical fiber 4 is flush with the principle surface of plane substrate 5. The use of core diameter expanding fibers as optical fibers 4 can increase the spot size of each of the endfaces of optical fibers 4 and decrease the transmission loss and connection loss between optical fibers 4. At this time, optical fibers 4 are installed so that the core diameter thereof is largest in groove 1.

Figure 4D:
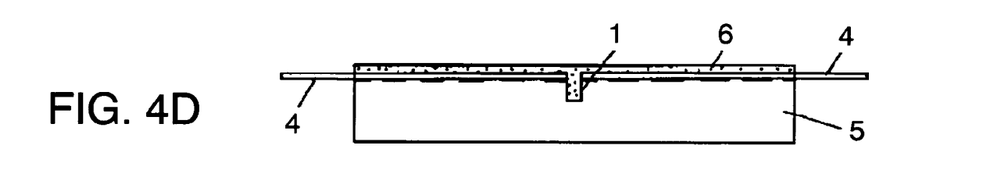
Figure 4E:
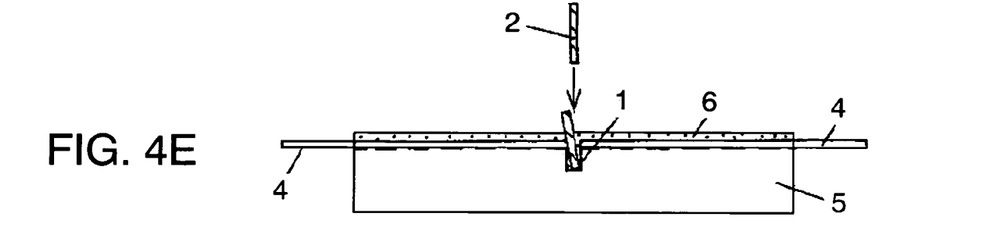

Next, as a fourth step, as shown in FIG. 4D, optical adhesive 6 is applied to the entire principle surface of plane substrate 5. Further, as shown FIG. 4E, filter 2 is inserted in groove 1 having optical adhesive 6 charged therein. At this time, the size of filter 2 is set so that the upper portion of filter 2 always projects from the principle surface of plane substrate 5. Additionally, the inside of groove 1 formed in the second step is also filled with optical adhesive 6. The use of optical adhesive 6 having a refractive index substantially equal to that of the core material of optical fibers 4 to be used can decrease the connection loss between the optical fibers. Methods of curing optical adhesive 6 include using light, e.g. ultraviolet light, and heating. The method of using light is advantageous for reducing production time.

Figure 4F:
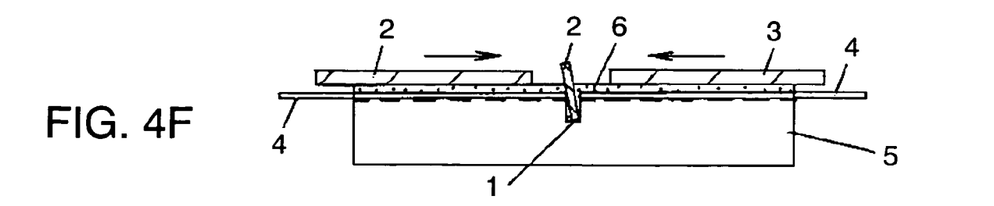

Next, as a fifth step, as shown in FIG. 4F, covers 3 are moved from both sides of filter 2 projecting from groove 1 to sandwich and clamp the filter on both sides. At this time, mounting one of covers 3 so that the side face thereof is aligned with one of the side faces of groove 1 allows filter 2 to be mounted and fixed along the side face of groove 1. This method eliminates the need of registering two sheets of covers 3 at the same time and thus simplifies fabrication of the optical filter module. Additionally, when filter 2 is clamped at an angle, fixing one of the covers makes it easy to adjust the angle. This method is also useful to prevent breakage of filter 2 when the filter is sandwiched by the other cover 3. The sandwiched portion is a projecting portion of filter 2. It is desirable that the length of the projecting portion of filter 2 is at least half the thickness of cover 3 in consideration of the strength of filter 2, because filter 2 is sandwiched by covers 3. When filter 2 is warped, the projecting portion is made longer to increase the area sandwiched by covers 3: thus, the warp is straitened. When glass or other material is used for the substrate of filter 2, its large elastic modulus is effective in preventing breakage caused by stress.

Figure 4G:
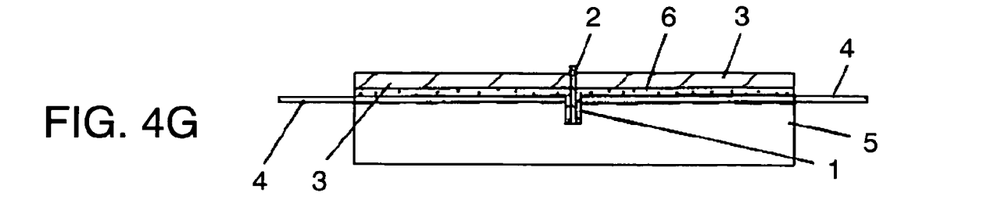

At last, as a sixth step, as shown in FIG. 4G, the optical filter module is completed by irradiating covers 3 and/or plane substrate 5 with light, such as ultraviolet light, or heating, to cure the adhesive. The use of a photo-curing adhesive or heat-hardening adhesive as adhesive 6 allows covers 3 to be bonded without application of mechanical pressure. Thus, the optical axes of optical fibers 4 are unlikely to be misaligned. Additionally, the time taken for mounting can be reduced.

Fourth Exemplary Embodiment

FIGS. 5A through 5G show a procedure of fixing optical fibers 4 on plane substrate 5, and then forming filter insertion groove 1 in plane substrate 5 and inserting filter 2 therein.

Figure 5A:
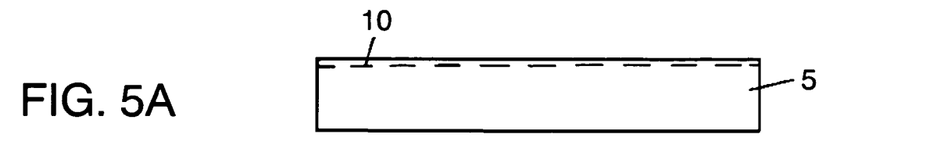
FIGS. 5A through 5G are explanatory views illustrating a method of manufacturing an optical filter module in accordance with a fourth exemplary embodiment of the present invention.

As a first step, as shown in FIG. 5A, a necessary number of V-shaped grooves for fixing optical fibers 4 are precisely formed on the principle surface of plane substrate 5. At this time, the angle and depth of each V-shaped groove 10 are set so that each optical fiber 4 is flush with the principle surface of plane substrate 5.

Figure 5B:
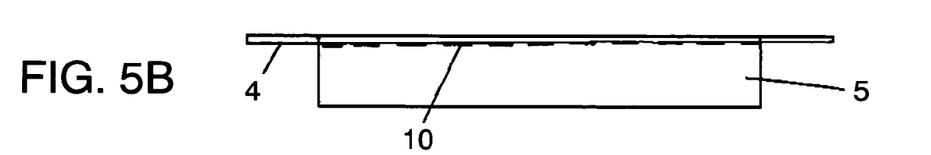

As a second step, as shown in FIG. 5B, each optical fiber 4 is installed in corresponding V-shaped groove 10. The use of core diameter expanding fibers as optical fibers 4 is effective in increasing the spot size of each of the endfaces of optical fibers 4 and decreasing the transmission loss and connection loss between optical fibers 4. At this time, each optical fiber 4 is installed so that the core diameter thereof is largest in a place where groove 1 is to be formed.

Figure 5C:
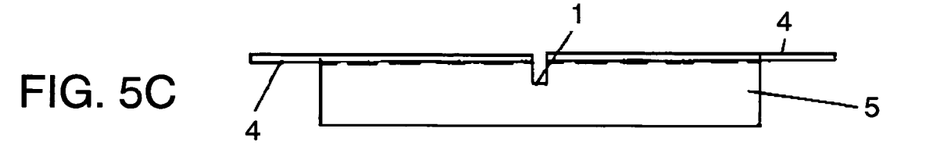
Figure 5D:
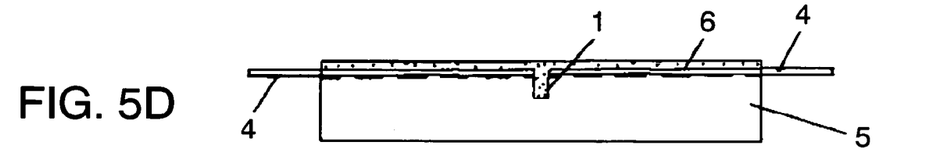
Figure 5E:
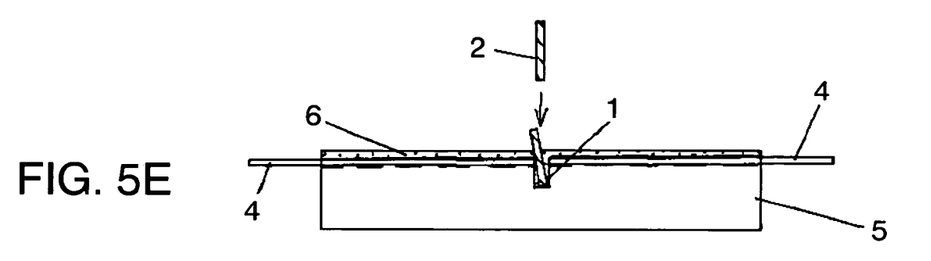
Figure 5F:
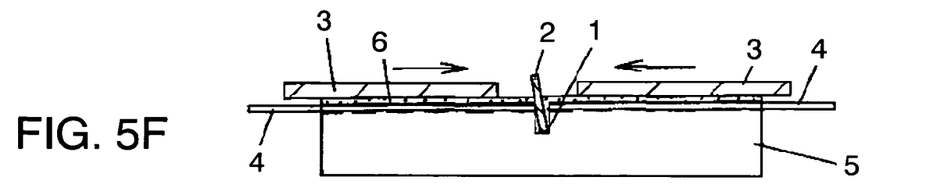
Figure 5G:
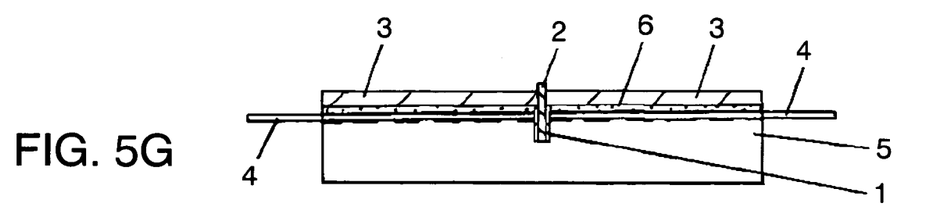

As a third step, as shown FIG. 5C, groove 1 sufficiently wide for the thickness of filter 2 is formed so as to be displaced at a minute angle of θ from the right angle of optical fibers 4. In this case, optical fibers 4 are cut at the same time. In order to decrease surface roughness of the endfaces of cut and separated optical fibers 4, it is desirable to use abrasive grains as small as possible in machining. In the present invention, a diamond grindstone is used to form groove 1. The endfaces of optical fibers 4 like a mirror surface can be obtained by selecting diamond abrasive grains of at least #3000 (average particle diameter: up to 5 μm).

The steps shown in FIGS. 5D through 5G are similar to those of the third exemplary embodiment, and thus the descriptions are omitted.

Fifth Exemplary Embodiment

FIGS. 6A through 6F show a procedure of fixing optical fibers 4 at one of the endfaces of a groove, inserting filter 2 therein, and then placing the other optical fibers 4 against the filter.

Figure 6A:
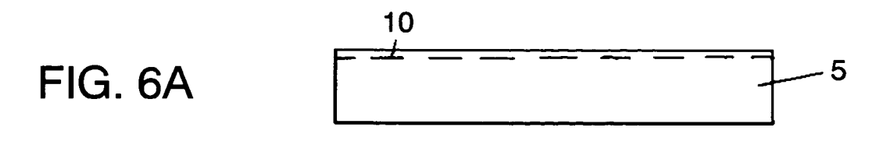
FIGS. 6A through 6F are explanatory views illustrating a method of manufacturing an optical filter module in accordance with a fifth exemplary embodiment of the present invention.

As a first step, as shown in FIG. 6A, a necessary number of V-shaped grooves 10 for fixing optical fibers 4 are precisely formed on the principle surface of plane substrate 5. At this time, the angle and depth of each V-shaped groove 10 are set so that each optical fiber 4 is flush with the principle surface of plane substrate 5.

Figure 6B:
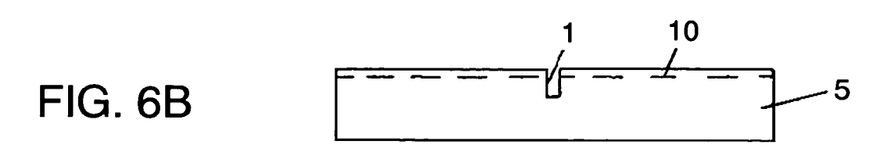

As a second step, as shown in FIG. 6B, filter insertion groove 1 sufficiently wide for the thickness of filter 2 is formed so as to intersect V-shaped grooves 10. At this time, as shown in the first and second exemplary embodiments, groove 1 is formed so as to be displaced at a minute angle of θ from the right angle of the optical passages. As groove 1, an appropriate shape is selected from the structures shown in FIGS. 2A through 2D.

Figure 6C:
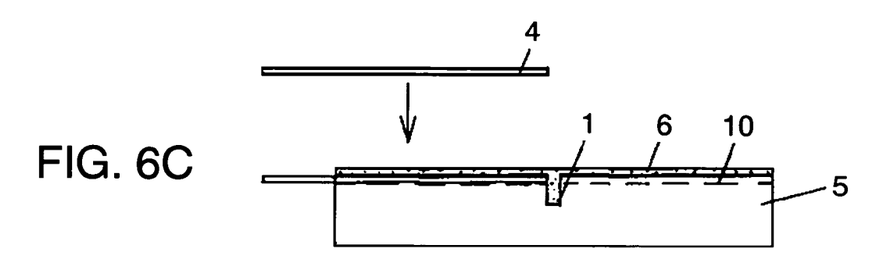

As a third step, as shown in FIG. 6C, optical adhesive 6 is applied to the entire principle surface of plane substrate 5. Either optical fibers 4 for input or optical fibers 4 for output is placed in corresponding V-shaped grooves 10.

Figure 6D:
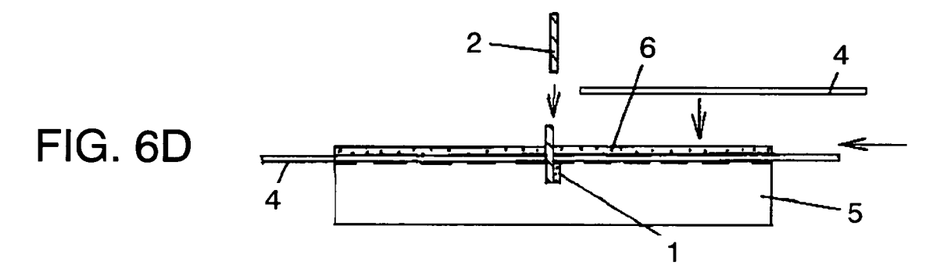

As a fourth step, as shown in FIG. 6D, filter 2 is inserted in groove 1. Then, the other optical fibers 4 are inserted as they are slid along corresponding V-shaped grooves 10. The other optical fibers are placed against filter 2 so that the gap between filter 2 and the other optical fibers 4 is as small as possible. This placement can considerably decrease attenuation of light caused by scattering, irregular reflection and changes in refractive index. At this time, the use of core diameter expanding fibers as optical fibers 4 is effective in increasing the spot size of each of the endfaces of optical fibers 4 and decreasing the transmission loss and connection loss between optical fibers 4. Each optical fiber 4 is installed so that the core diameter thereof is largest in groove 1.

Figure 6E:
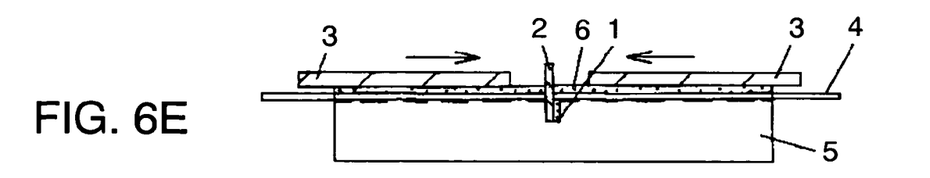
Figure 6F:
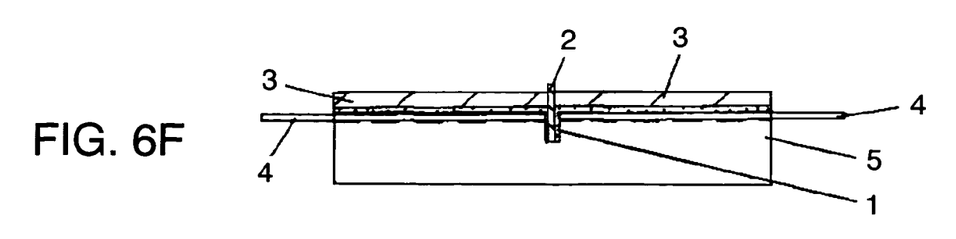

The steps shown in FIGS. 6E and 6F are similar to those of the third exemplary embodiment, and thus the descriptions are omitted.

Sixth Exemplary Embodiment

FIGS. 7A through 7F show a procedure followed when optical passages 20 have already been embedded in plane substrate 5.

Figure 7A:
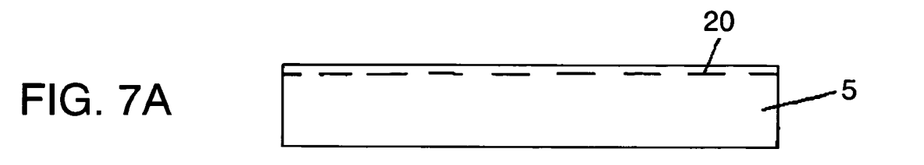
FIGS. 7A through 7F are explanatory views illustrating a method of manufacturing an optical filter module in accordance with a sixth exemplary embodiment of the present invention.
Figure 7B:
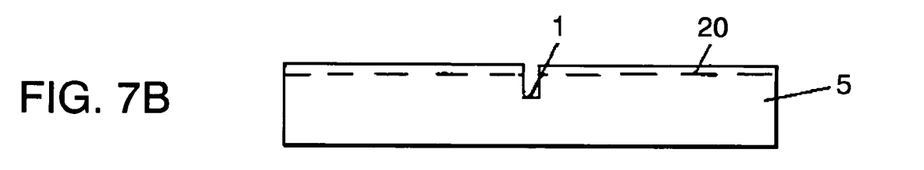
Figure 7C:
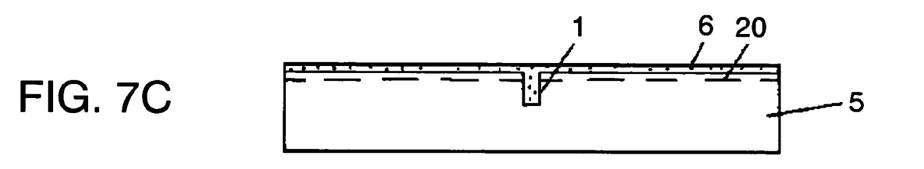
Figure 7D:
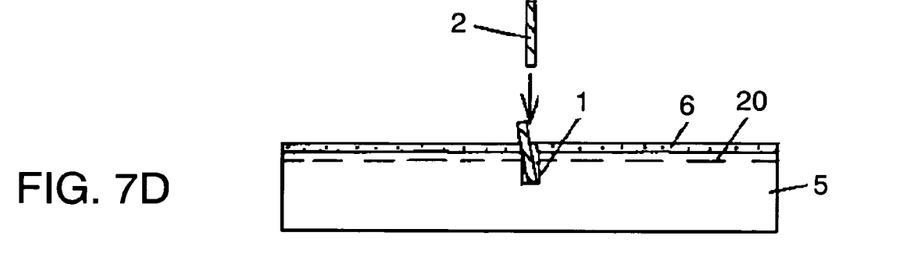
Figure 7E:
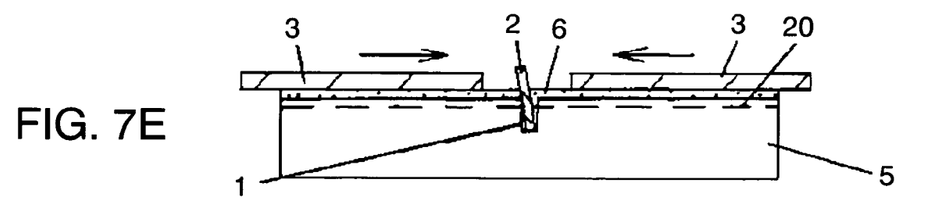
Figure 7F:
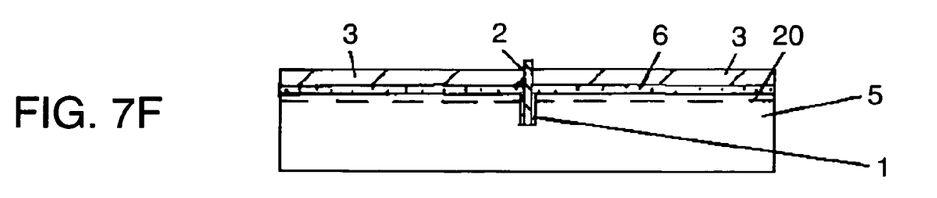

When optical passages 20, such as diffusion glass waveguides and polymer waveguides, are embedded in plane substrate 5, as shown FIG. 7A, V-shaped grooves 10 need not be formed. As shown FIG. 7B, groove 1 sufficiently wide for the thickness of filter 2 is formed so as to be displaced at a minute angle of θ from the right angle of the optical passages. Next, adhesive 6 is applied to the top surface of plane substrate 5 as shown in FIG. 7C, and filter 2 is inserted therein as shown in FIG. 7D. At this time, adhesive 6 having a refractive index as equal as possible to that of optical passages 20 is selected. After insertion of filter 2 in groove 1, two sheets of covers 3 placed on plane substrate 5 are moved as shown in FIG. 7E, to sandwich filter 2. At this time, filter 2 is clamped at a predetermined angle. As shown FIG. 7F, filter 2 is sandwiched at a desired angle and bonded using light or heat.

INDUSTRIAL APPLICABILITY

Fixing optical passages using precise V-shaped grooves so as to avoid misalignment of optical axes thereof facilitates optical axis adjustment, which is supposed to be most critical and difficult in connection of optical passages. Forming a filter insertion groove so as to be displaced at a minute angle of θ from the right angle of the optical axes can prevent entry of reflected or scattered light caused by the wall surfaces of the groove. Selecting a filter insertion groove having a shape most appropriate for a filter to be inserted allows more precise connection between the filter and the optical passages. In production of an optical filter module, it is difficult to insert a filter while precisely aligning optical axes. There are also problems in downsizing. This structure can provide an extremely small optical filter module easily.

The invention claimed is:

1. An optical filter module comprising:
   an optical passage;
   a plane substrate fabricated to form a filter insertion groove thereon so as to intersect said optical passage;
   a filter inserted in said filter insertion groove; and
   covers covering said optical passage and bonded to said plane substrate, said covers sandwiching and clamping a portion of said filter projecting from said filter insertion groove therebetween, wherein a length of the portion of said filter projecting from said filter insertion groove is at least half the thickness of each of said covers.

2. The optical filter module of claim 1, wherein
   said optical passage has an intersection; and
   said filter insertion groove intersects said intersection.

3. The optical filter module of claim 1, wherein said optical passage is an optical fiber.

4. The optical filter module of claim 1, wherein said optical passage is a core diameter expanding fiber.

5. The optical filter module of claim 4, wherein an endface of said optical passage exposed to a wall surface of said filter insertion groove is a portion having an expanded core diameter of said core diameter expanding fiber.

6. The optical filter module of claim 1, wherein a bottom of said filter insertion groove is formed to have a shape tapered from both groove wall surfaces toward a bottom surface thereof.

7. The optical filter module of claim 1, wherein a bottom of said filter insertion groove is formed to have a V-shaped section.

8. The optical filter module of claim 1, wherein a bottom of said filter insertion groove is formed to have a semicircular section.

9. The optical filter module of claim 1, wherein a bottom of said filter insertion groove is formed to have a shape tapered from one of groove wall surfaces toward the other.

10. The optical filter module of claim 1, wherein said filter is fixed along one of groove wall surfaces of said filter insertion groove.

11. The optical filter module of claim 1, wherein an angle formed by said optical passage with said filter ranges from 5 to 10 degrees.

12. The optical filter module of claim 1, wherein the angle formed by said optical passage with said filter is provided on a principal surface of said plane substrate.

13. The optical filter module of claim 12, wherein the angle formed by said optical passage with said filter is provided in a direction perpendicular to the principal surface of said plane substrate.

14. The optical filter module of claim 1, wherein at least one of said plane substrate and said covers is fabricated to form a V-shaped groove thereon for receiving said optical passage.

15. The optical filter module of claim 1, wherein said covers and said plane substrate are bonded together using one of a photo-curing adhesive and a heat-hardening adhesive.

16. A method of manufacturing an optical filter module comprising the steps of:
   forming a filter insertion groove so that said groove intersects an optical passage formed in a plane substrate;
   inserting a filter in said filter insertion groove;
   moving at least one of two covers placed on said plane substrate to sandwich and clamp therebetween and to support a portion of said filter projecting from said filter insertion groove with said cover, wherein a length of the portion of said filter projecting from said filter insertion groove is at least half the thickness of each of said covers; and bonding said cover onto said plane substrate.

17. The method of manufacturing an optical filter module of claim 16 further comprising the steps of:

forming a V-shaped groove on said plane substrate; and forming said optical passage in said V-shaped groove.

18. A method of manufacturing an optical filter module comprising the steps of:

forming a V-shaped groove on a plane substrate;

forming a filter insertion groove so that said groove intersects said V-shaped groove;

forming optical passages so that one end of each of said optical passages corresponds to said filter insertion groove;

inserting a filter in said filter insertion groove;

moving at least one of two covers placed on said plane substrate to sandwich and clamp therebetween and to support a portion of said filter projecting from said filter insertion groove with said cover, wherein a length of the portion of said filter projecting from said filter insertion groove is at least half the thickness of each of said covers; and bonding said cover onto said plane substrate.

19. The optical filter module of claim 2, wherein said portion extends beyond the tops of said covers.

20. The method of claim 16, wherein said portion extends beyond the top of said cover.

21. The method of claim 18, wherein said portion extends beyond the top of said cover.

* * * * *